United States Patent
Rollin, Jr.

(10) Patent No.: US 7,998,578 B2
(45) Date of Patent: Aug. 16, 2011

(54) POLYPHENYLENE SULFIDE SPUNBOND FIBER

(75) Inventor: Paul Ellis Rollin, Jr., Hendersonville, TN (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/335,899

(22) Filed: Dec. 16, 2008

(65) Prior Publication Data

US 2010/0151246 A1 Jun. 17, 2010

(51) Int. Cl.
  *D01F 8/00* (2006.01)
(52) U.S. Cl. ........................ 428/373; 428/374
(58) Field of Classification Search ............... 428/357, 428/364, 365, 369
  See application file for complete search history.

(56) References Cited

U.S. PATENT DOCUMENTS

| | | | | |
|---|---|---|---|---|
| 4,942,091 A | * | 7/1990 | Umezawa et al. | 428/398 |
| 5,244,467 A | * | 9/1993 | Umezawa et al. | 8/115.69 |
| 5,405,695 A | * | 4/1995 | Akatsu et al. | 428/364 |
| 5,424,125 A | * | 6/1995 | Ballard et al. | 428/364 |
| 6,110,589 A | * | 8/2000 | Harwood et al. | 428/364 |
| 6,350,852 B1 | * | 2/2002 | Haubs et al. | 528/388 |
| 6,730,439 B2 | * | 5/2004 | Kamei et al. | 429/247 |
| 6,949,288 B2 | * | 9/2005 | Hodge et al. | 428/370 |
| 2004/0235383 A1 | * | 11/2004 | Perry et al. | 442/344 |
| 2005/0269011 A1 | * | 12/2005 | Auerbach et al. | 156/62.6 |
| 2008/0070021 A1 | * | 3/2008 | Rollin, Jr. | 428/219 |
| 2009/0156075 A1 | * | 6/2009 | Rollin et al. | 442/199 |

* cited by examiner

*Primary Examiner* — Arti Singh-Pandey

(57) ABSTRACT

The present invention is directed to a spunbond fiber comprising polyphenylene sulfide polymer having a zero shear viscosity at 300° C. of about 21,500 to about 28,000 Pa·s.

8 Claims, No Drawings

POLYPHENYLENE SULFIDE SPUNBOND FIBER

BACKGROUND OF THE INVENTION

1. Field of the Invention

The present invention relates to the production of polyphenylene sulfide fibers and products including the same.

2. Description of the Related Art

Filtration processes are used to separate compounds of one phase from a fluid stream of another phase by passing the fluid stream through filtration media, which traps the entrained or suspended matter. The fluid stream may be either a liquid stream containing a solid particulate or a gas stream containing a liquid or solid aerosol.

For example, filters are used in collecting dust emitted from incinerators, coal fired boilers, metal melting furnaces and the like. Such filters are referred to generally as "bag filters." Because exhaust gas temperatures can be high, bag filters used to collect hot dust emitted from these and similar devices are required to be heat resistant. Bag filters can also be used in chemically corrosive environments. Thus, dust collection environments can also require a filter bag made of materials that exhibit chemical resistance. Examples of common filtration media include fabrics formed of aramid fibers, polyimide fibers, fluorine fibers and glass fibers.

Polyphenylene sulfide (PPS) polymers exhibit thermal and chemical resistance. As such, PPS polymers can be useful in various applications. For example, PPS can be useful in the manufacture of molded components for automobiles, electrical and electronic devices, industrial/mechanical products, consumer products, and the like.

PPS has also been proposed for use as fibers for filtration media, flame resistant articles, and high performance composites. Despite the advantages of the polymer, however, there are difficulties associated with the production of fibers from PPS.

It is difficult to spin PPS fibers from a spunbond process over a commercially useful period of time. Commercially available PPS resins have either too low or too high of a viscosity for a spunbond process. A low viscosity PPS resin creates excessive breaks in the fibers and defects in the spunbond web. A high viscosity PPS resin creates too much torque in the extruder making the resin unspinnable.

What is needed is a spunbond process that can make PPS fibers that can be continuously spun with minimal disruption of the spinning process.

SUMMARY OF THE INVENTION

The present invention provides a commercially viable process to make spunbond polyphenylene sulfide fiber.

The present invention is directed to a spunbond fiber comprising polyphenylene sulfide polymer having a zero shear viscosity at 300° C. of about 21,500 to about 28,000 Pa·s.

DETAILED DESCRIPTION OF THE INVENTION

Attempts at spinning commercial quantities of spunbond polyphenylene sulfide (PPS) fibers with commercially available PPS resins have been unsuccessful.

The present invention is directed to a spunbond fiber comprising polyphenylene sulfide polymer having a specific zero shear viscosity which allows extended spinning runs with minimal spinning defects. It was found that spunbond PPS fibers can be made using polyphenylene sulfide polymer having a zero shear viscosity at 300° C. of about 21,500 to about 28,000 Pa·s.

Because PPS resin having a zero shear viscosity at 300° C. of about 21,500 to about 28,000 Pa·s was not available for testing, two commercially available PPS resins (one with a high viscosity and one with a low viscosity) were blended together in order to make a blended PPS resin with a zero shear viscosity at 300° C. of about 21,500 to about 28,000 Pa·s. The blended PPS resin was successfully spunbond for commercially acceptable spinning times with minimum defects. Although a zero shear viscosity at 300° C. of about 21,500 to about 28,000 Pa·s is adequate for the invention, a shear viscosity at 300° C. of about 22,500 to about 27,000 Pa·s is preferred and a shear viscosity at 300° C. of about 23,500 to about 26,000 Pa·s is most preferred.

It should be noted that any standard spunbond process as known in the art would be applicable to this invention. PPS fibers of the invention can have average fiber diameters of less than about 50 micrometers and more preferably less than about 20 micrometers. The fibers generally have substantially round cross sections, but other cross sections such as multilobal cross sections could be made as would be known to one of ordinary skill in the art.

The spunbond fibers of the invention are typically collected into a web on a collector or screen. In one particularly advantageous aspect of the invention, the web is used to produce filtration media. In this embodiment, the fibers of the invention can exhibit good thermal and chemical resistance. The fibers can also exhibit good flexibility and tensile strength and can be manipulated to produce products for use in corrosive and/or high temperature environments.

Test Methods

Zero Shear Viscosity was calculated as follows. The viscosity of Fortron PPS 0309 C4 and Fortron PPS 0317 C1 were measured individually at several different shear rates at 300° C. The viscosity at zero shear is then extrapolated from the viscosity data. The viscosity of the blends is then approximated using the equation below which is derived from the Arrhenius equation relating viscosity with polymer concentration:

$$\log \text{Viscosity}_{(blend)} = (n \log \text{Viscosity}_{(polymer\ 1)} + (100-n) \log \text{Viscosity}_{(polymer\ 2)})/100$$

Fiber Diameter was determined as follows. A bundle of fibers were carefully collected just below the attenuating jet. The fiber bundle was then prepared for viewing under an optical microscope. A digital image of the fiber bundle was then captured and with the aid of computer. The diameter of at least thirty (30) clearly distinguishable fine fibers were measured from the photographs and recorded. Defects were not included (i.e., lumps of fine fibers, polymer drops, intersections of fine fibers). The average (mean) fiber diameter for each sample was calculated.

EXAMPLES

The present invention will be further illustrated by the following non-limiting examples.

Comparative Example A

In this example, a spunbond fabric was made from polyphenylene sulfide. The polyphenylene sulfide component has a melt flow index of 101 g/10 min at 316° C. under a load of 2.16 kg and is available from Ticona as Fortron® PPS 0309 C1. The zero shear viscosity for this resin, measured at 300° C. is calculated to be 21,000 Pa·s.

The polyphenylene sulfide resin was dried in a through air dryer at a temperature of 115° C., to a moisture content of less than 150 parts per million. The polyphenylene sulfide resin was heated to 295° C. then metered to a spin-pack assembly where the melt stream was filtered and then distributed through a stack of distribution plates to provide multiple rows of spunbond fibers having a circular cross section.

The spin pack assembly consisted of 4316 round capillary openings (155 rows where the number of capillaries vary from 22 to 28). Each capillary has a diameter of 0.35 mm and a length of 1.40 mm. The width of the pack in the machine direction was 18.02 cm and in the cross direction was 115.09 cm. The spin pack assembly was heated to 295° C. and the polymer was spun through each capillary at a polymer throughput rate of 1.0 g/hole/min. The fibers were cooled in a cross flow quench extending over a length of 122 cm. An attenuating force was provided to the bundle of fibers by a rectangular slot jet. The maximum attainable jet pressure while maintaining a spinning process was 70.3 kPa. The distance from the spin-pack to the entrance of the jet was 92.45 cm. The fibers exiting the jet were collected on a forming belt. A vacuum was applied underneath the belt to help pin the fibers to the belt. The spunbond layer was then thermally bonded between an embosser roll and an anvil roll. The bonding conditions were 148° C. roll temperature and 300 pli nip pressure. After thermal bonding, the spunbond sheet was formed into a roll using a winder. The process was characterized by numerous broken filaments occurring across the entire width of the spinneret face. These broken filaments were found in the sheet product and because of their size and different melting behavior; the physical and barrier properties of the sheet material would be negatively impacted. Also, these broken filaments collected and built up on the attenuating jet until the jet became obstructed. The obstructed jet, of course, would disrupt sheet formation. In addition, the broken filaments lead to un-attenuated polymer which also obstructed the jet or contaminated the formation belt. The belt became littered with polymeric residue containing a fibrous tail which ultimately leads to a defect image in the sheet. Because these broken filaments had a tendency to "snap," the spinneret face also became contaminated by recoiling polymer. The spinneret face then needed to be dressed by scraping. The spinning process was found to be poor. Fiber spinning conditions, spinning performance and properties are listed in the Table.

Example 1

Example 1 was prepared similarly to Comparative Example A except the Ticona resin Fortron® PPS 0309 C1 was modified by the addition of Ticona resin Fortron® PPS 0317 C1. Fortron PPS 0317 C1 has a zero shear viscosity measured at 300° C. that is calculated to be 31850 Pa·s. Fortron® PPS 0317 C1 was homogeneously blended into the Fortron® PPS 0309 C1 at a loading of 10% by weight and introduced at the throat of the extruder to raise the zero shear viscosity, measured at 300° C., to a calculated value of 22800 Pa·s. The maximum attainable jet pressure while maintaining a spinning process was 134.4 kPa. Although broken filaments were still observed, the number and frequency was greatly reduced. The process would run stably for about an hour or two before needing to be shut down to dress the jet or spinneret face.

Fiber spinning conditions, spinning performance and properties are listed in the Table.

Example 2

Example 2 was prepared similarly to Example 1 except the Fortron® PPS 0317 C1 was homogeneously blended into the Fortron® PPS 0309 C1 at a loading of 30% by weight. The maximum attainable jet pressure while maintaining a spinning process was 133.1 kPa. No broken filaments were observed during spinning and the process ran uninterrupted for more that six (6) hours. Fiber spinning conditions, spinning performance and properties are listed in the Table.

Example 3

Example 3 was prepared similarly to Example 2 except the highest jet pressure attainable while maintaining the stable fiber spinning was found to be 209.6 kPa. No broken filaments were observed during spinning and the process ran uninterrupted for more that six (6) hours. Fiber spinning conditions, spinning performance and properties are listed in the Table.

Example 4

Example 4 was prepared similarly to Example 3 except the throughput was reduced to 0.8 ghm. Broken filaments were observed, their numbers, however, were greatly reduced and the frequency of the occurrence was intermittent. The process would run stably for about four (4) hours before needing to be shut down to dress the jet or the spinneret face. Fiber spinning conditions, spinning performance and properties are listed in the Table.

Comparative Example B

In this example, set up and process conditions were initially set as is described in Comparative Example A with the exception that the polyphenylene sulfide component was Ticona Fortron® PPS 0317 C1. Although the resin is sold as a spunbond grade, the viscosity is too high for processing. Attempts to modify the initial spinning conditions to improve fiber spinning were unsuccessful. Spinning was largely characterized by defects. Defect such as drips, fiber breaks, and slow holes. No spinning conditions could be found to allow for defect free spinning for prolonged periods of time.

TABLE

| Example | % PPS 0309 | % PPS 0317 | Calculated Zero Shear Viscosity (Pa · s) | Attenuating Jet Pressure (kPa) | Throughput (g/h/m) | Average Fiber Diameter (micrometers) | Spinning Stability |
|---|---|---|---|---|---|---|---|
| Comp A | 100 | 0 | 21000 | 70.3 | 1.0 | 21.6 | Poor |
| 1 | 90 | 10 | 21800 | 134.4 | 1.0 | 17.7 | Fair |
| 2 | 70 | 30 | 24400 | 133.1 | 1.0 | 18.1 | Excellent |
| 3 | 70 | 30 | 24400 | 209.6 | 1.0 | 16.0 | Excellent |

TABLE-continued

| Example | % PPS 0309 | % PPS 0317 | Calculated Zero Shear Viscosity (Pa·s) | Attenuating Jet Pressure (kPa) | Throughput (g/h/m) | Average Fiber Diameter (micrometers) | Spinning Stability |
|---|---|---|---|---|---|---|---|
| 4 | 70 | 30 | 24400 | 209.6 | 0.8 | 13.1 | Good |
| Comp B | 0 | 100 | 30600 | — | — | — | None |

As can be seen from the Table, PPS with only a narrow range of zero shear viscosity is viable for producing spunbond PPS fibers.

What is claimed is:

1. A spunbond fiber, consisting of polyphenylene sulfide polymer having a zero shear viscosity at 300° C. of about 21,500 to about 28,000 Pa·s.

2. The fiber of claim 1, wherein said polyphenylene sulfide polymer has a zero shear viscosity at 300° C. of about 22,500 to about 27,000 Pa·s.

3. The fiber of claim 2, wherein said polyphenylene sulfide polymer has a zero shear viscosity at 300° C. of about 23,500 to about 26,000 Pa·s.

4. The fiber of claim 1, wherein said fiber has an average fiber diameter of less than about 50 micrometers.

5. The fiber of claim 4, wherein said fiber has an average fiber diameter of less than about 20 micrometers.

6. The fiber of claim 1, wherein said fiber has a circular cross section.

7. The fiber of claim 1, wherein said fiber has a multi-lobal cross section.

8. A web comprising the fiber of claim 1.

* * * * *